(12) United States Patent
Laursen

(10) Patent No.: US 8,538,920 B2
(45) Date of Patent: Sep. 17, 2013

(54) SYSTEM AND METHOD FOR STORAGE SERVICE

(75) Inventor: Dana E. Laursen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 58 days.

(21) Appl. No.: 13/205,022

(22) Filed: Aug. 8, 2011

(65) Prior Publication Data

US 2013/0041873 A1 Feb. 14, 2013

(51) Int. Cl.
*G06F 17/30* (2006.01)

(52) U.S. Cl.
USPC ........... 707/626; 707/638; 707/600; 707/601; 707/602; 707/693; 719/316

(58) Field of Classification Search
USPC .......... 707/626, 638, 600–602, 693; 719/316
See application file for complete search history.

(56) References Cited

U.S. PATENT DOCUMENTS

| | | | | |
|---|---|---|---|---|
| 5,202,986 A | * | 4/1993 | Nickel | 1/1 |
| 5,287,500 A | * | 2/1994 | Stoppani, Jr. | 711/211 |
| 5,963,944 A | * | 10/1999 | Adams | 1/1 |
| 6,192,405 B1 | * | 2/2001 | Bunnell | 709/225 |
| 6,226,743 B1 | * | 5/2001 | Naor et al. | 713/177 |
| 6,279,007 B1 | * | 8/2001 | Uppala | 1/1 |
| 6,351,776 B1 | * | 2/2002 | O'Brien et al. | 709/245 |
| 6,453,325 B1 | * | 9/2002 | Cabrera et al. | 1/1 |
| 6,463,454 B1 | * | 10/2002 | Lumelsky et al. | 718/105 |
| 6,505,200 B1 | * | 1/2003 | Ims et al. | 707/638 |
| 6,505,205 B1 | * | 1/2003 | Kothuri et al. | 1/1 |
| 6,754,697 B1 | | 6/2004 | Berstis | |
| 6,826,626 B1 | | 11/2004 | McManus | |
| 7,146,368 B2 | * | 12/2006 | Sonoda et al. | 1/1 |
| 7,317,907 B2 | * | 1/2008 | Linkert et al. | 455/412.1 |
| 7,403,987 B1 | * | 7/2008 | Marinelli et al. | 709/223 |
| 7,647,329 B1 | * | 1/2010 | Fischman et al. | 707/999.1 |
| 8,185,497 B2 | * | 5/2012 | Vermeulen et al. | 707/626 |
| 2002/0138559 A1 | * | 9/2002 | Ulrich et al. | 709/203 |
| 2002/0143755 A1 | * | 10/2002 | Wynblatt et al. | 707/3 |
| 2002/0147929 A1 | * | 10/2002 | Rose | 713/201 |
| 2002/0161781 A1 | * | 10/2002 | Leong et al. | 707/103 R |
| 2002/0165727 A1 | * | 11/2002 | Greene et al. | 705/1 |
| 2003/0046270 A1 | * | 3/2003 | Leung et al. | 707/1 |
| 2003/0061067 A1 | * | 3/2003 | Atwal et al. | 705/1 |
| 2003/0088659 A1 | * | 5/2003 | Susarla et al. | 709/223 |
| 2003/0204551 A1 | * | 10/2003 | Chen | 709/102 |
| 2004/0168084 A1 | * | 8/2004 | Owen et al. | 713/201 |
| 2004/0193879 A1 | * | 9/2004 | Sonoda et al. | 713/165 |
| 2005/0055322 A1 | * | 3/2005 | Masters et al. | 707/1 |
| 2005/0065879 A1 | * | 3/2005 | Birch et al. | 705/40 |
| 2005/0076343 A1 | * | 4/2005 | Kammhuber | 719/316 |
| 2005/0108380 A1 | * | 5/2005 | Odhner et al. | 709/223 |
| 2006/0149806 A1 | * | 7/2006 | Scott et al. | 709/201 |
| 2006/0168154 A1 | * | 7/2006 | Zhang et al. | 709/220 |
| 2006/0190556 A1 | * | 8/2006 | Lane et al. | 709/217 |
| 2006/0206510 A1 | * | 9/2006 | Moulhaud et al. | 707/101 |
| 2007/0027907 A1 | * | 2/2007 | Kulkarni et al. | 707/103 R |
| 2007/0276786 A1 | | 11/2007 | Piedmonte | |

(Continued)

FOREIGN PATENT DOCUMENTS

JP 2000305817 A 11/2000
WO WO 2008099539 A1 8/2008

*Primary Examiner* — Frantz Coby

(57) ABSTRACT

A storage service stores data from a network device. A data collector retrieves the data for the storage service based on reference data passed to the storage service from the network device.

20 Claims, 5 Drawing Sheets

(56) References Cited

U.S. PATENT DOCUMENTS

| | | | |
|---|---|---|---|
| 2008/0159166 A1* | 7/2008 | Take et al. | 370/252 |
| 2009/0216832 A1* | 8/2009 | Quinn et al. | 709/203 |
| 2009/0216839 A1* | 8/2009 | Yokoyama et al. | 709/206 |
| 2009/0276593 A1* | 11/2009 | Jacobson et al. | 711/162 |
| 2010/0274772 A1* | 10/2010 | Samuels | 707/693 |

* cited by examiner

SYSTEM AND METHOD FOR STORAGE SERVICE

BACKGROUND

In current large data storage applications, a client typically requests that a third party service store data for the client. For example, current data storage services provide data storage capabilities for clients who have registered with the service. In order to store data with the service, the clients send a request to store data along with the data itself in the same transaction. Thus, the client pushes the data to the service while the service is merely a repository for the data. Such push data models can take a lengthy amount of time to complete a transaction since the entire data file must be transferred before the transaction is completed. If the transaction is not completed before the client becomes unavailable, (e.g., client wireless device loses battery power) the entire transaction may have to be restarted which takes considerable time and resources.

DETAILED DESCRIPTION

Figure 1:
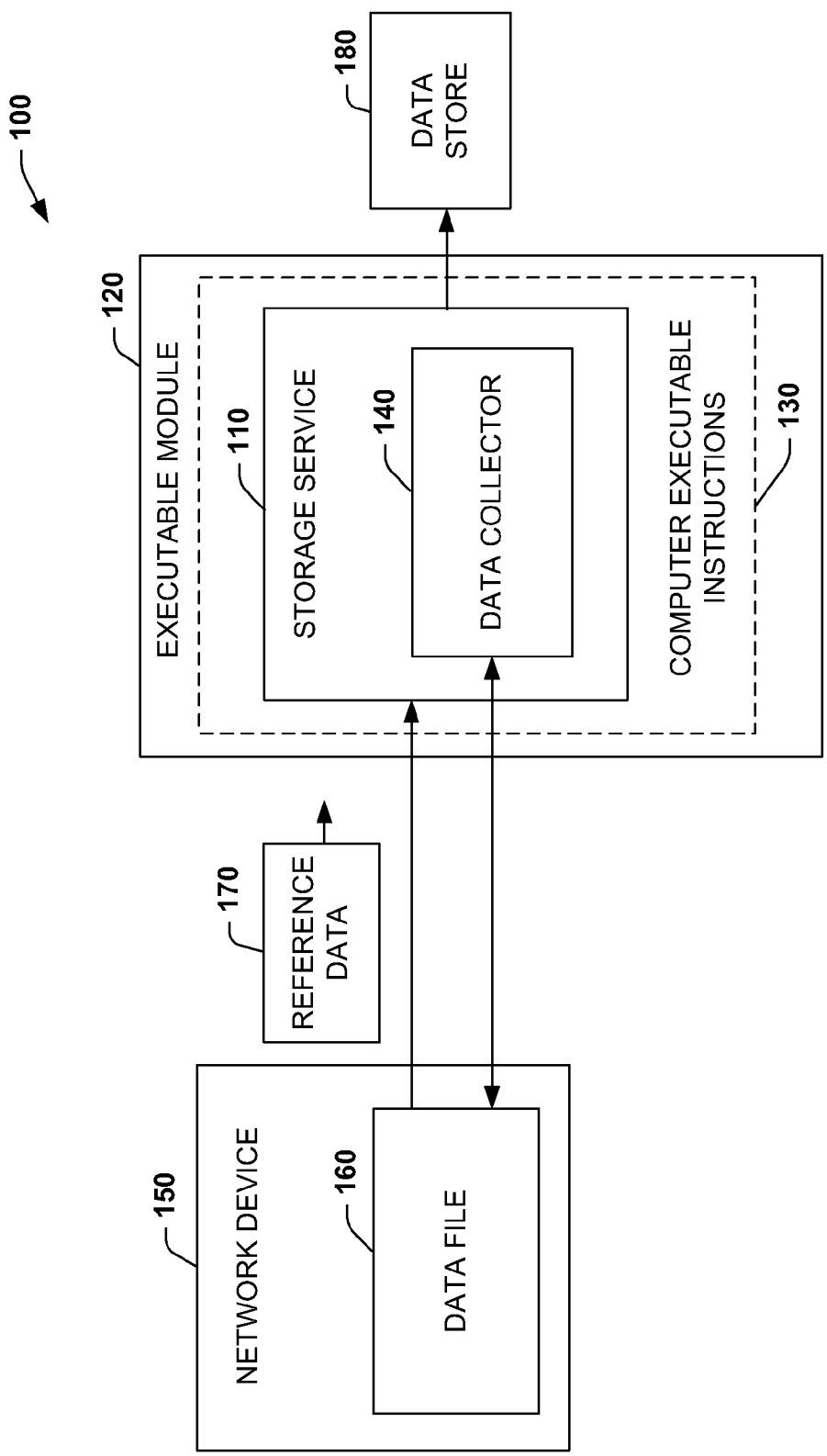
FIG. 1 illustrates an example system that provides a storage service for storing data.

FIG. 1 illustrates an example system 100 that provides a storage service 110 for storing data. The system 100 includes an executable module 120 that includes computer executable instructions 130 that define the storage service 110 and an associated data collector 140. The storage service 110 is provided to store large quantities of data from a network device 150, where the data at the network device is represented as a data file 160, where the data file represents a grouping of data bytes or words. The data collector 140 retrieves the data file 160 for the storage service 110 based on reference data 170 passed to the storage service from the network device 150. The reference data 170 can include reference pointers that are codes used to locate the data file. The reference data 170 can be a reference address containing the explicit address to the data file 160 or the reference data can be a reference name which provides an indict specification to the data file 160.

Upon receiving the reference data 170, the storage service 110 can begin to pull the data file 160 via the data collector 140 and store it in a data store 180 (e.g., disk drive). The pull operation of the data file 160 can be spread out over multiple packets and time or queued to be collected at some point in the future such as via a schedule, for example. In general, the network device 150 submits a storage request to the storage service 110 where the reference data 170 is passed to the data file 160. The storage service 110 then requests the data file 160 from the network device 150 via the data collector 140. The network device 150 then delivers and transmits the data file 160 to the storage service 110 via the data collector 140 where it is aggregated at the data storage 180.

Pulling the data file 160 from the network device 150 utilizing the reference data 170, offers several benefits over standard push models. In one example, the storage service 110 is able to respond quickly to requests with data references such as the reference data 170 as compared to requests for all contents of the data file 160. In another example, the storage service 110 queues requests if overloaded, then transfers data as processing cycles become available. The network device 150 can be substantially any type of device that transmits data over a network (e.g., wired and/or wireless network) such as a laptop computer, server, mobile phone, personal digital assistant (PDA), network printer, scanner, and so forth. The reference data 170 can include an address for identifying a location of the data file 160. In addition to an address, the reference data 170 can include a number of bytes (or other designator such as a number of words or bits) to be retrieved from the respective address. In another example, the reference data 170 can include an end of file code to enable the data collector 140 to determine when to stop transferring data from the network device 150. The address passed by the reference data 170 could include a universal resource locator (URL) address or a file transfer protocol (FTP) address, for example. As will be described below with respect to FIG. 2, the data collector 140 can retrieve the data file 160 as packet bundles that are distributed over time as network bandwidth permits or can retrieve the data file according to a schedule where data transfer is scheduled or queued for some time in the future.

The executable module 120 can be provided as a non-transitory computer readable medium having computer readable instructions 130. This includes the storage service 110 that employs the data collector 140 to pull data files 160 from the network device 150 and utilizing the reference data 170. The data collector 140 operates with the storage service 110 to retrieve data from the network device 150 based upon a request from the device to store data. The data collector 140 can represent network interface instructions including security interfaces to retrieve the data file 160 from the network device 150. The network interface instructions employed by the data collector 140 could include an HTTP get command for example, where the get command utilizes the reference data 170 (e.g., "get (reference data, number of bytes)") to pull the data file 160 from the network device 150. The network interface instructions utilized by the data collector 140 can include various security options for interacting with the network device 150 (e.g., utilizing encryption or certificates to securely access the data file 160 and gain trust of network device 150). The data storage 180 can be substantially any medium for storing data such as hard disk drives or other magnetic storage including large databases controlled by server farms, for example.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, as computer executable instructions (e.g., software, firmware), hardware (e.g., CPU, an application specific integrated circuit), or as a combination of both. In other examples, the components could be distributed among remote devices across a network, for example.

Figure 2:
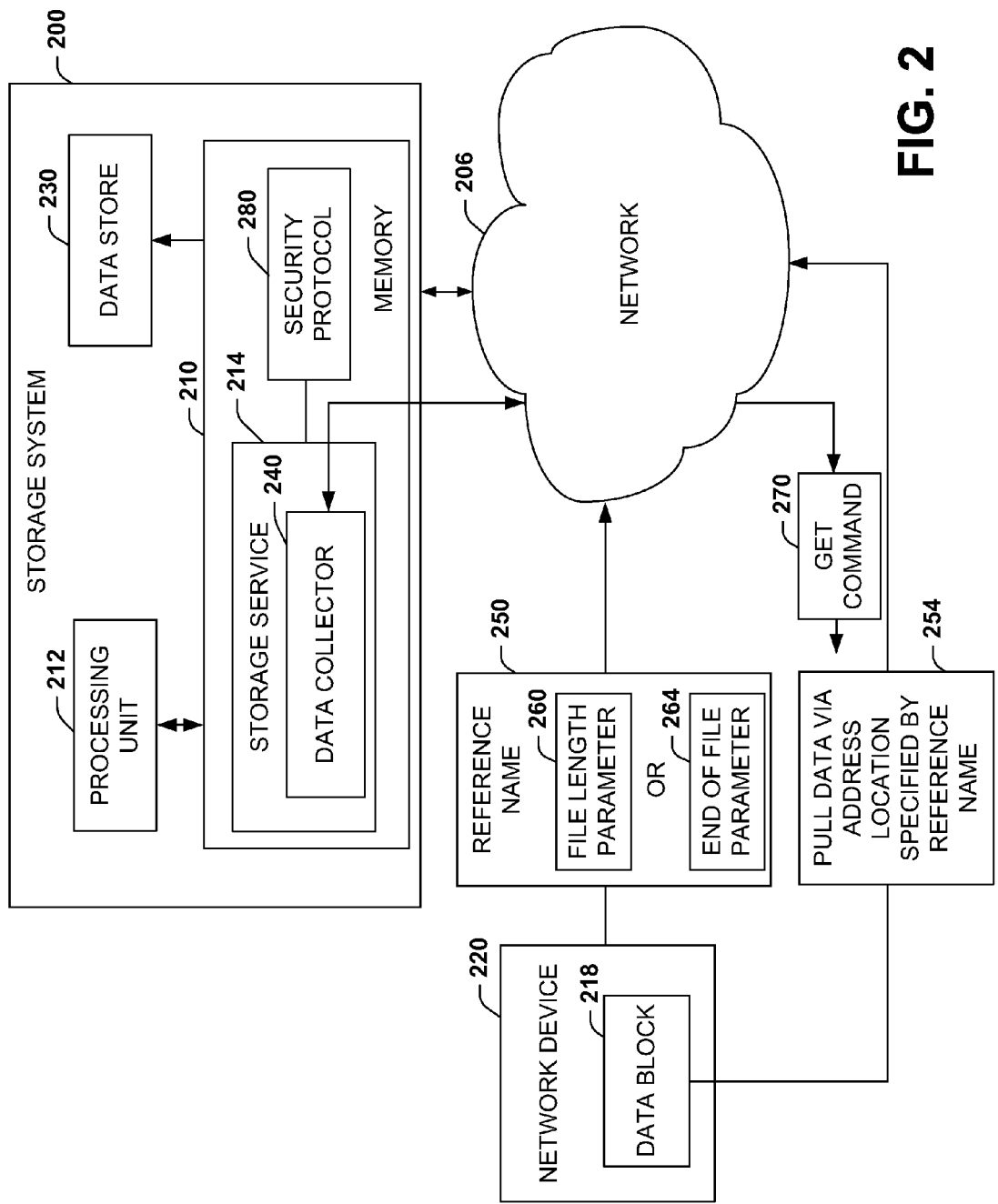
FIG. 2 illustrates an example of a storage system employed in a network environment with network commands and security.

FIG. 2 illustrates an example of a storage system 200 employed in a network environment with network commands and security. The storage system 200 can be implemented, for example, as part of a computing cloud shown as network 206 and described below. The network 206 can be implemented, for example, as the Internet or a local area network. Nodes on the network 206 can communicate via a communications protocol, such as Transmission Control Protocol/Internet Protocol (TCP/IP), Internet Protocol version 6 (IPv6), and so forth. A memory 210 is provided for storing computer executable instructions. The storage system 210 can also include, for example, a processing unit 212 (e.g., a processor core) for accessing the memory 210 and executing computer executable instructions and related data. The memory 210 can include a storage service 214 similar to that described above with respect to FIG. 1.

The storage service 214 is employed to aggregate a data block 218 (or data blocks) from a network device 220 (or devices) and stores the data block 218 via the service at data store 230. The data block 218 can represent a number of bytes or words that are not necessarily associated by a file structure although a data block 218 can also be a data file as previously described. A data collector 240 processes a reference name 250 associated with the network device 220, wherein the data collector pulls the data block 218 from the network device 220 according to an address location specified by the reference name as shown at reference numeral 254. The reference name 250 can directly specify an address or be an indirection name to some location of the data block 218. A file length parameter 260 or an end of file parameter 264 can be employed to specify an amount of data to be transferred from the data block 218 in accordance with the reference name 250. A get command 270 can be utilized by the data collector 240 to pull the data shown at 254 from the network device 220 in accordance with the reference name 250 and the file length parameter 260 or the end of file parameter 264. A security protocol 280 can be utilized with the get command 270 to pass through security blocks (e.g., firewall) that may be setup on the network device 220. The security protocol 280 can include a secure socket layer, a trusted certificate, or an encrypted channel to pass through a firewall of the network device 220, for example.

Before proceeding, further description is provided for the get command 270, security protocol 280, and network 206 shown as a cloud configuration. Cloud computing is location-independent computing, whereby shared servers provide resources, software, and data to computers and other devices on demand. The term "cloud" is typically used as a metaphor for the Internet, based on the cloud drawing often used to represent computer networks. Although the Internet is the most common network 206 that may be employed with the storage service 214 described herein, other network configurations are possible (e.g., internal corporate networks). Cloud computing describes a supplement, consumption, and delivery model for information technologies services based on the Internet, and can involve over-the-Internet provision of dynamically scalable and often virtualized resources such as the storage services, including the storage system 200, described herein.

With respect to the get command 270, this is but one example of how data can be pulled from the network device 220 via the reference name 250. Substantially any network command that employs the reference name 250 to pull data as described herein can be utilized. In one specific example of a get command 270, an HTTP get command operates as a command line HTTP file grabber. It can operate through a proxy service and can communicate using Secure Socket Layer (SSL), for example. This command can default to copying the file specified in the command line URL, for example. A filename can also be specified to send the data block 218 to a local file designated at the data store 230. Another form of the get command 270 can be an FTP get command where files are transferred from one computer to another using file transfer protocol.

With respect to the security protocol 280, various security options can be employed with the get command 270 to pull data from the network device 220. For example, the network device 220 may have a firewall or other security measure where security is to be negotiated between the storage service 214 and the network device 220. For example, if a client mobile device were to submit a data storage request to the storage service 214 and was to be unavailable for some length of time (e.g., client device turned off on airplane), data transfer between the client device and the storage service would have to be scheduled for some point in the future. For example, a schedule table could be setup to contact the client device several hours in the future or at a specified data in the future. At the scheduled time or date, a background routine or scheduler could invoke the storage service 214 to initiate a data pull transaction with the client device. At the scheduled time or date, the storage service 214 may need to negotiate one or more security parameters via the security protocol 280 in order to complete the scheduled data transfer with the network device 220.

As noted previously, one type of security protocol 280 that may be employed by the storage service 214 may include a secure sockets layer (SSL). Secure Sockets Layers are cryptographic protocols that provide communication security over the Internet. This layer encrypts the segments of network connections above the Transport Layer, using asymmetric cryptography for privacy and a keyed message authentication code for message reliability. Several versions of these security protocols 280 are employed in applications such as web browsing, electronic mail, Internet faxing, instant messaging, data storage, and voice-over-IP (VoIP), for example. Another type of security protocol 280 can include the use of digital certificates where public and private keys are exchanged between storage service 214 and network device 220 before further data communications can occur. As noted above, encryption or other security measure can also be utilized in accordance with the security protocols 280.

Figure 3:
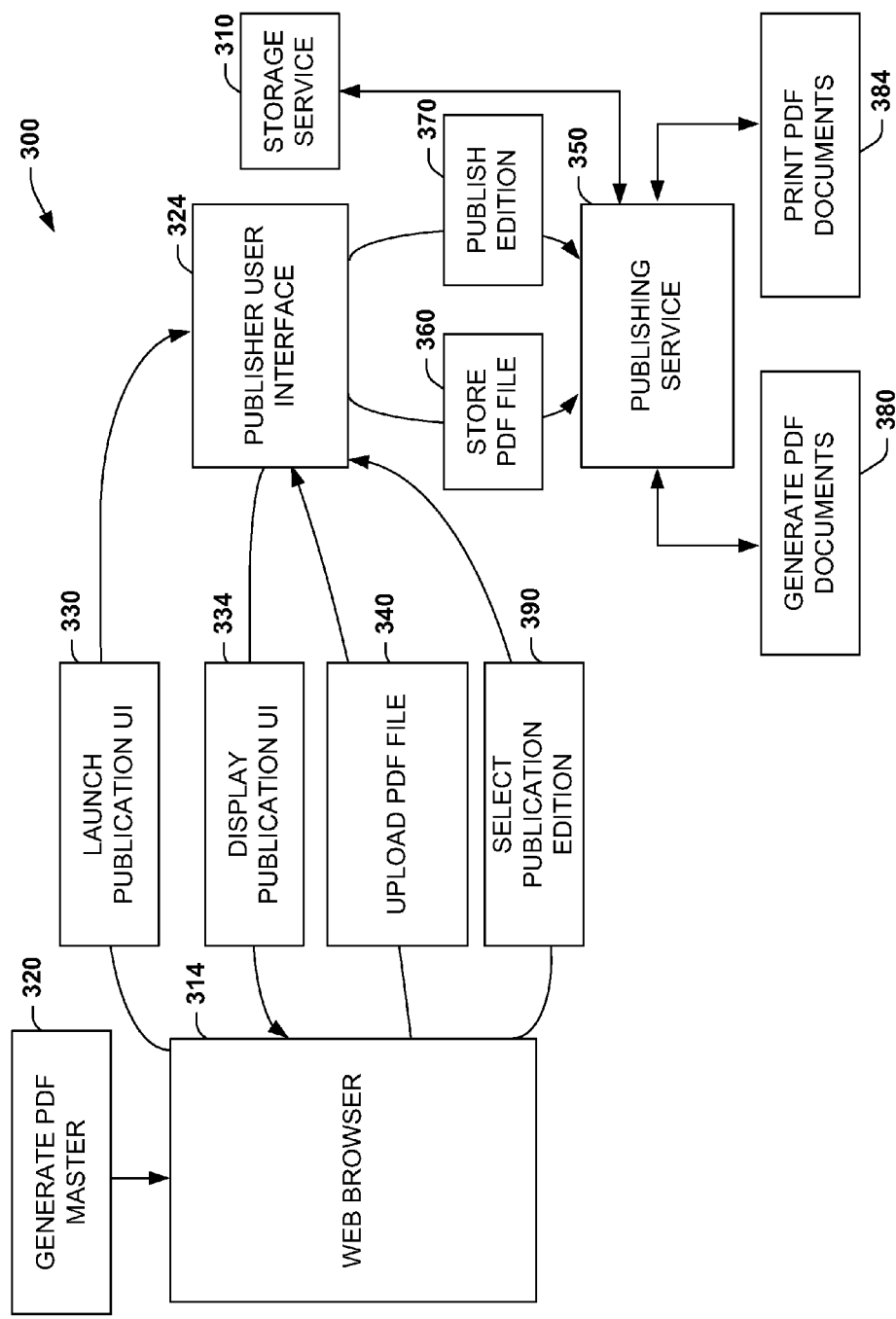
FIG. 3 illustrates an example of a publication application that utilizes a storage service.

FIG. 3 illustrates an example of a publication application 300 that utilizes a storage service 310. The application 300 includes a web browser 314 that provides an interface to generate a PDF master file 320. The web browser 320 launches a publication user interface 324, where the launch process is illustrated at flow block 330. The browser 314 displays the publication user interface 324 at flow block 334. At flow block 340, a PDF file is uploaded by the storage service 310 utilizing reference data as previously described. The storage service 310 can work in conjunction with a publishing service 350 to store a PDF file 360 and publish editions 370. The publishing service 350 can also generate PDF documents at 380 and print PDF documents at 384. Another aspect of the web browser 314 enables selecting publication editions at 390. As shown, the application 300 can employ the storage service 310 to retrieve files, such as shown at 340, by utilizing a reference data passed by network device operating the web browser 314 in this example, and pulling the files over time or according to a scheduled time as described above. Security protocols can also be employed to retrieve the respective files in accordance with the browser.

Figure 4:
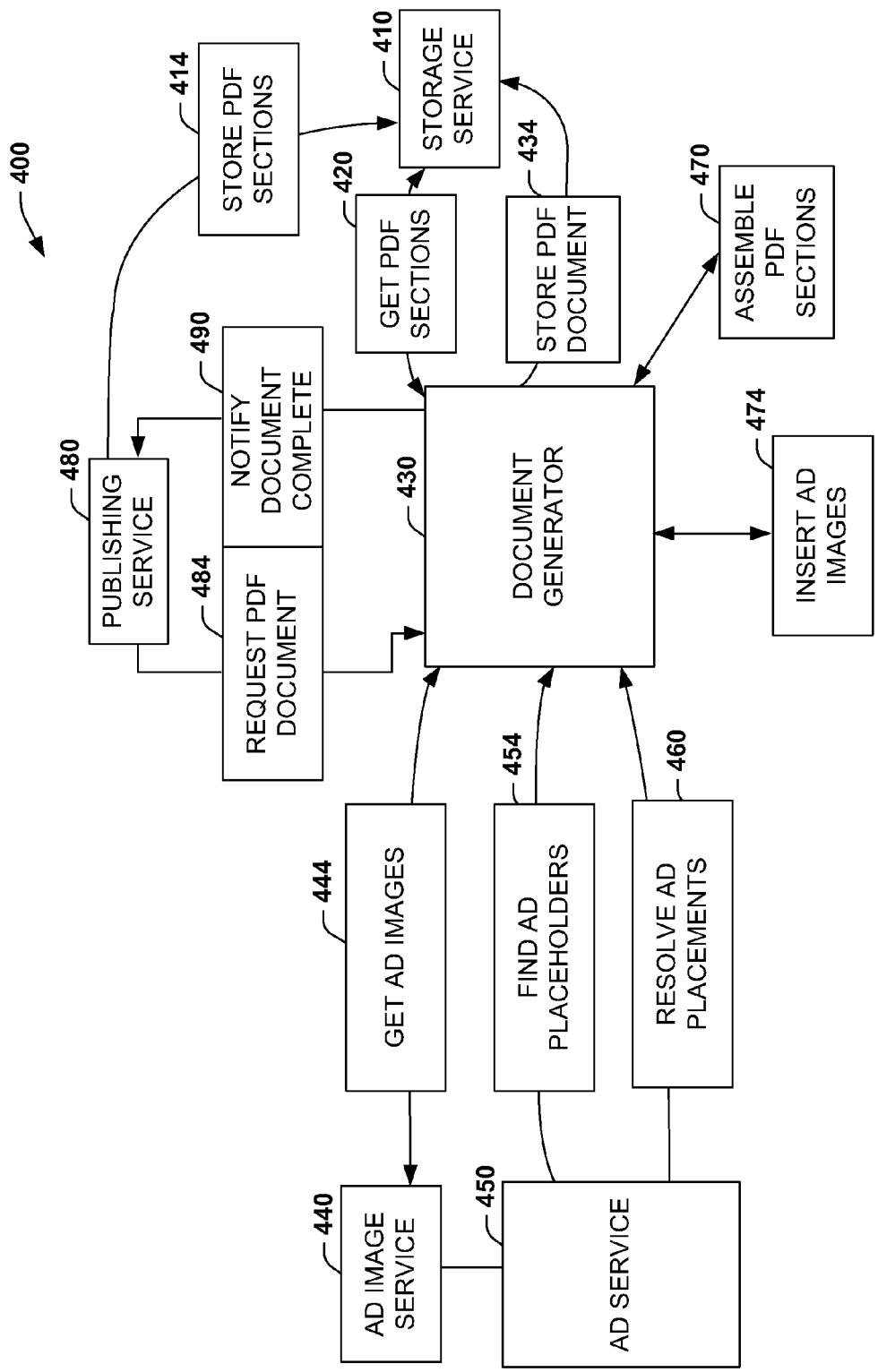
FIG. 4 illustrates an example of an alternative publication application that utilizes a storage service.

FIG. 4 illustrates an alternative example of a publishing application 400 that utilizes a storage service 410. As shown, the storage service can store PDF sections 414, get PDF sections from a document generator 430, and store PDF documents at 434. In each case at 414, 420, and 434, respectively, the storage service 410 can utilizes reference data as previously described to pull data from the application 400. Other aspects of the application 400 include an Ad (advertising) image service 440 which transmits images to the document generator 430 via flow block 444. An Ad Service 450 finds Ad placeholders and resolves Ad placements 460 for the document generator 430. The document generator 430 assembles PDF sections 470 and inserts Ad images at 474. The document generator 430 may interact with a publishing service 480 via a request for PDF document block 484 and a notify document complete handshake at 490. Similar to the applications previously described, the storage service 410 can utilize security protocols to interact with various portions of the application 400.

Figure 5:
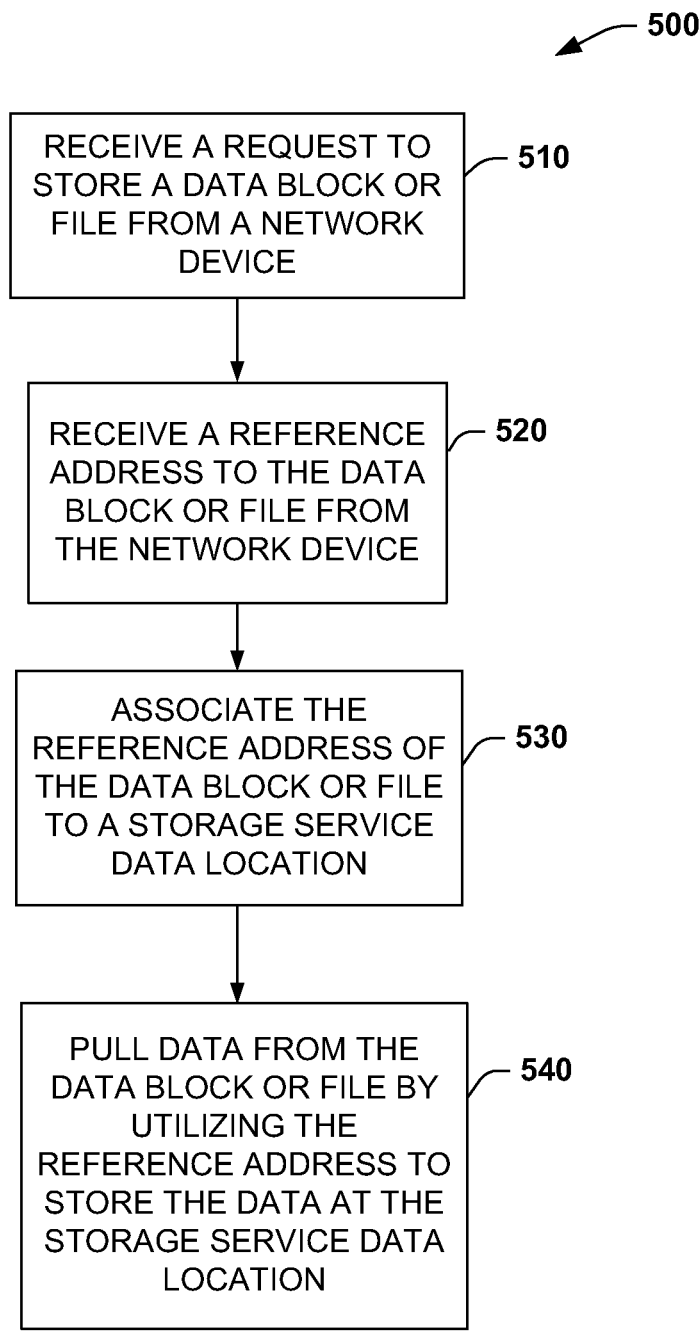
FIG. 5 illustrates an example method for storing data utilizing a reference address.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by a processor and associated equipment, for example.

FIG. 5 illustrates an example method 500 for storing data utilizing a reference address. The method 500 includes receiving a request to store a data block or file from a network device at 510. Such request could be sent by a remote network client, such as a cell phone or wireless laptop, for example. At 520, the method 500 includes receiving a reference address to the data block of file from the network device. Such reference address could include the actual physical address for the data block/file or an indirect address to the block/file such as a relative address (e.g., address pointing to an address) to a file, for example. At 530, the method 500 includes associating the reference address of the data block or file to a storage service data location. This could be achieved by a storage service reserving space on a hard drive, for example, or scheduling to store a specified amount of data with a database server (e.g., reserve two megabytes for data assigned to reference address). At 540, the method 500 includes pulling data from the data block or file by utilizing the reference address to store the data at the storage service data location. This could include utilizing a get command or other network command that utilized the reference address to pull the data from the network device. Although not shown, other aspects of the method 500 include receiving a block length parameter or an end of file parameter with the reference address to determine a length for the data block or file. This could also include utilizing a security protocol in conjunction with the get command to acquire the data from the data block or file, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium comprising computer executable instructions comprising:
    a storage service to receive a request from a client computer via a network, the request being to store data, the request including reference data generated at the client computer that identifies an address of the data, the storage service comprising:
        a data collector to pull the data via the network for the storage service based on the reference data in response to the request to store the data;
    wherein the storage service is further to store the data in a data store in response to the data collector pulling the data.

2. The non-transitory computer readable medium of claim 1, wherein the data collector is further to pull the data via the network from the address of the data included in the reference data.

3. The non-transitory computer readable medium of claim 2, wherein the reference data includes a number of bytes to be retrieved from the address.

4. The non-transitory computer readable medium of claim 2, wherein the reference data includes an end of file code to enable the data collector to determine when to stop transferring data.

5. The non-transitory computer readable medium of claim 2, wherein the address is a universal resource locator (URL) address or a file transfer protocol (FTP) address for identifying the location of the data.

6. The non-transitory computer readable medium of claim 1, wherein the data collector is further to delay the pull of the data until the storage service has sufficient available bandwidth on the network.

7. The non-transitory computer readable medium of claim 6, wherein the data collector is further to initiate the pull of the data at a time specified in a schedule.

8. The non-transitory computer readable medium of claim 1, wherein the data collector employs a network get command to retrieve the data from the client computer.

9. The non-transitory computer readable medium of claim 8, wherein the data collector employs a security protocol to pass the data through a firewall of the network to access the data file when using the network get command.

10. The non-transitory computer readable medium of claim 9, wherein the security protocol includes a secure socket layer, a trusted certificate, or an encrypted channel to pass through the firewall of the network.

11. The non-transitory computer readable medium of claim 1, further comprising a publishing application that utilizes the storage service to retrieve files for a document generator utilizing the reference data.

12. A method, comprising:
    receiving, by a storage service computer, a request to store a data block from a client computer;
    receiving, by the storage service computer, a reference address to the data block from the client computer, wherein the reference address includes data identifying a location for the data block and the reference address is generated by the client computer;
    associating, by the storage service computer, the reference address of the data block to a storage service data location;
    pulling, by the storage service computer, the data block by utilizing the reference address; and
    storing the data block at the storage service data location.

13. The method of claim 12, wherein the reference address includes a block length parameter or an end of file parameter with the reference address to determine an end of the data block.

14. The method of claim 13, wherein the pulling further comprising executing, at the storage service computer, a get command to acquire the data block from the client computer.

15. The method of claim 14, further comprising utilizing a security protocol in conjunction with the get command to acquire the data from the client computer.

16. A system, comprising:
   a memory for storing computer executable instructions; and
   a processing unit for accessing the memory and executing the computer executable instructions, the computer executable instructions comprising:
      a storage service to receive a request via a network from a client computer to store data at the storage service, the request comprising a reference name that characterizes an address of the data, wherein the reference data is generated by the client computer, wherein the reference name comprises a file length parameter that specifies a length of the data; and
      a data collector to:
         process the reference data; and
         pull the data via the network according to the address of the data specified by the reference data and the file length parameter.

17. The non-transitory computer readable medium of claim 1, wherein the data collector is further to delay the pull of the data until sufficient processing cycles are available at the storage service.

18. The non-transitory computer readable medium of claim 1, wherein the time specified in the schedule is at least one hour after a time that the request to store the data is received from the at the storage service.

19. The method of claim 12, further comprising delaying, by the storage service computer, the pulling until sufficient processing cycles are available at the storage service.

20. The system of claim 16, wherein the data collector is further to delay the pull of the data until sufficient processing cycles of the processing unit are available.

* * * * *

UNITED STATES PATENT AND TRADEMARK OFFICE
CERTIFICATE OF CORRECTION

| | | |
|---|---|---|
| PATENT NO. | : 8,538,920 B2 | |
| APPLICATION NO. | : 13/205022 | |
| DATED | : September 17, 2013 | |
| INVENTOR(S) | : Dana E. Laursen | |

It is certified that error appears in the above-identified patent and that said Letters Patent is hereby corrected as shown below:

In the Claims

In column 8, line 15, in Claim 18, delete "from the at the" and insert -- from the --, therefor.

Signed and Sealed this
Tenth Day of December, 2013

Margaret A. Focarino
*Commissioner for Patents of the United States Patent and Trademark Office*